United States Patent [19]

Ahmad et al.

[11] Patent Number: 4,519,430
[45] Date of Patent: May 28, 1985

[54] ENERGY SAVING TIRE WITH SILICA-RICH TREAD

[75] Inventors: Shamim Ahmad, Canal Fulton; Ronald J. Schaefer, Medina, both of Ohio

[73] Assignee: The B. F. Goodrich Company, Akron, Ohio

[21] Appl. No.: 403,222

[22] Filed: Jul. 29, 1982

[51] Int. Cl.³ .................. B60C 11/00; B60C 9/04; B60C 15/00
[52] U.S. Cl. .................. 152/209 R; 152/354 R; 152/356 R; 152/359; 152/361 R; 152/362 R; 524/571; 524/574; 524/575
[58] Field of Search ............... 152/209 R, 211, 330 R, 152/354 R, 354 RB, 355, 356 R, 356 A, 359, 374, 362 R, 361 R; 156/123, 127, 128.1, 129; 524/571, 574, 575; 556/429

[56] References Cited

U.S. PATENT DOCUMENTS

| 4,184,998 | 1/1980 | Shippy et al. ................ 524/201 |
| 4,224,197 | 9/1980 | Ueda et al. ............... 152/209 R X |
| 4,281,703 | 8/1981 | Ahmad ..................... 152/209 R |

OTHER PUBLICATIONS

Wagner, M. P., "Precipitated Silicas- . . . Shortages", *Elastomeric*, Aug. 1981, pp. 40-44.
Wagner, M. P., "Fine-Particle Silicas in Tire Treads . . . Skim", *Rubber Chemistry and Technology*, May-Jun. 1977, vol. 50, No. 2, pp. 356-363.

Primary Examiner—William A. Powell
Assistant Examiner—Thomas Bokan
Attorney, Agent, or Firm—Alfred D. Lobo; Harry F. Pepper, Jr.

[57] ABSTRACT

A pneumatic radial tire is provided with a tread having from 1 part by weight of hydrated amorphous fine-particle silica per 3 parts of carbon black tread reinforcing filler, to about 3 parts by weight of the silica to 1 part of the carbon black. The amount of silica present is preferably in the range from about 18 parts to about 50 parts by weight per 100 parts of natural or synthetic rubber. When such a tread is compounded with a mercaptosilane in which the mercapto group is reversibly blocked, the tread provides reduced rolling resistance without loss of traction. Such reduction in rolling resistance without loss of traction is not observed when the silica is not coupled with the mercaptosilane coupling agent.

8 Claims, 1 Drawing Figure

ENERGY SAVING TIRE WITH SILICA-RICH TREAD

BACKGROUND OF THE INVENTION

It is recognized that the overall fuel consumption efficiency of a wheeled motor vehicle is based on its weight, its frontal area and its rolling resistance. Since rolling resistance is determined by the tires of the vehicle, much effort has been directed to lowering the rolling resistance of pneumatic 'radial' automobile and truck tires, as for example disclosed in U.S. Pat. No. 4,281,703, which teaches that a particular tread composition on a conventional radial tire produces reduced rolling resistance.

Other patents, such as U.S. Pat. No. 4,224,197 and British (U.K.) patents Nos. 2,057,455 and 2,083,486 disclose the importance of providing a tire with a tread having low rolling resistance. The '455 U.K. patent teaches that lowering rolling resistance without adversely affecting the wet or dry traction of the tire is a difficult task.

A major reinforcing agent for rubber tread vulcanizates such as in automobile and truck tires, is carbon black. Carbon black greatly enhances mechanical strength and resistance to abrasion and is thus widely used. However, the availability of fine-particle reinforcing types of carbon black, including channel black, high abrasion furnace black (HAF), super abrasion furnace black (SAF), and intermediate super abrasion furnace black (ISAF), is petroleum-dependent, all being made by the thermal decomposition of hydrocarbons.

Concern over the availability of petroleum initiated several programs to evaluate numerous nonblack reinforcing fillers. The best nonblack fillers developed to date are the precipitated fine-particle silicas. In an article titled "Fine-Particle Silicas in Tire Treads, Carcass, and Steel-Belt Skim" by Wagner, M. P., published in *Rubber Chemistry and Technology*, Vol. 50, No. 2, May–June 1977, it was generally demonstrated that reinforcing silicas can be considered as alternates to contemporary fillers.

However, as pointed out in U.S. Pat. No. 4,150,014, vulcanizates obtained from silica or silicate filled polymers are known to be 'boardy', which may be described as a stiffness at low elongations and lack of resilience, and due to high tensile set, both of which deficiencies can be avoided in carbon black filled vulcanizates. Despite numerous efforts to resolve the problem satisfactorily, to date, we know of no silica-rich tread vulcanizate with acceptable strength, abrasion, resilience and tensile set properties which tread is the critical component of a pneumatic tire with reduced rolling resistance without substantial loss of wet or dry traction, irrespective of whether or not the silica-rich tread is especially formulated for low rolling resistance. By "silica-rich" we refer to a tread which contains at least 1 part hydrated amorphous fine particle silica per 3 parts by weight of carbon black filler. Further, we do not know of a silica-rich tread which can be used in a tire having reduced rolling resistance with substantially no loss of wet or dry traction, and the tire still produced at reasonable cost. This is in part due to the problem of selecting an acceptable silane coupling agent, and having made a suitable choice, incorporating the silane into a tread compound without deleteriously affecting workers in the plant. As is well known, mercaptosilane coupling agents, which have been found to be peculiarly suited for silica-filled tread vulcanizates, are overpoweringly malodorous.

The use of various silicon-containing coupling agents to enhance the adhesion of various inorganic substrates with a broad variety of organic polymers to promote coupling and bonding therewith is well known in the art. Examples are provided in U.S. Pat. Nos. 2,832,754; 2,971,864; 3,258,477; 3,661,628; 3,671,562; 3,705,911; 3,706,592; 3,754,971; 4,151,157 inter alia. As is conventionally understood, the silicon coupling agent serves as a cross-linker that is chemically or physically bonded to both the inorganic filler or other substrate, and the organic polymer in the polymer composite.

Among the numerous silane coupling agents deemed useful, it was found that those with a polysulfide structure are particularly well-adapted for the vulcanization of silica reinforced rubber compositions, particularly earthmover tire treads which require high tensile and tear properties, high roadwear index and low heat build-up. See *Reinforcing and Vulcanization Effects of Silane Si 69 in Silica-Filled Compounds*, presented at the Australasian Rubber Convention in Canberra, by Siegfried Wolff of Degussa Corporation in 1980. It was therefore quite unexpected that a mercapto-substituted silane in a silica-rich rubber tread would provide comparable physical properties as those disclosed for the Si 69 polysulfide, and in addition, provide a tire having a tread with reduced rolling resistance without loss of traction, both of which properties are determinative of the successful performance of a high quality automobile or truck tire.

A mercaptosilane coupling agent for a silica-filled SBR has been disclosed in an article titled *Precipitated Silicas—A Compounding Alternative with Impending Oil Shortages*, by Wagner, M. P. in *Elastomerics*, August 1981, pgs 40 et seq. However, there is no suggestion as to what effect the vulcanized tread may have on rolling resistance or on dry traction. Most importantly, there is no suggestion as to how a mercaptosilane may be incorporated into a tread compound on other than a laboratory scale, because of the problems of handling the mercaptosilane.

The problem of odor from a mercaptosilane was recognized and solved in U.S. Pat. No. 4,184,998 by reversibly blocking the mercapto group by a simple addition reaction. This converts the normally liquid mercaptosilane which is relatively easily vaporized under compounding conditions, into an essentially nonvolatile solid free from objectionable odor. It is also there disclosed that reinforcing grades of silica may be used as fillers in amounts as high as 17 parts silica per 40 parts of super abrasion furnace black mixed with 100 parts rubber, but there was no reason to expect that a tread compound containing such a silica in a wide range from as little as 5 parts to as much as about 75 parts by weight per 100 parts rubber, when vulcanized with the reversibly blocked mercaptosilane, would produce a tread with excellent dry traction and reduced rolling resistance.

SUMMARY OF THE INVENTION

It has been discovered that a silica-rich rubber tread having from about 5 parts to about 65 parts of a partially hydrated amorphous fine-particle silica per 100 parts of natural or synthetic rubber used to produce a vulcanized tread of a pneumatic tire, in combination with a mercaptosilane coupling agent to bond the silica to the rubber, produces lower rolling resistance without substantial loss of traction in the tire, compared to an otherwise identical tire with a lower amount of mercaptosilane-coupled silica, or the equivalent amount of silica without a coupling agent. Optionally, a minor quantity of an additional (third) solid particulate reinforcing filler may be used, if desired.

It has also been discovered that the foregoing improvement in rolling resistance without loss of traction is most preferably obtained when the silica is coupled to the rubber of the tread with a mercaptosilane coupling agent which has its mercapto group reversibly blocked by the presence of at least a molar equivalent of an organic compound capable of a simple addition reaction with the mercaptosilane.

It is therefore a specific object of this invention to provide a pneumatic tire having a silica-rich vulcanized tread containing preferably from about 18 parts to about 50 parts by weight of a partially hydrated amorphous fine-particle silica per 100 parts of rubber in the vulcanized tread, preferably each part by weight of silica being in combination with from about 0.333 parts to about 2 parts carbon black by weight, which silica unexpectedly provides the tire with lower rolling resistance, without substantial loss of wet and dry traction, than an otherwise identical tire in which the reinforcing filler is a conventionally used mixture of general purpose tread-filler carbon blacks, optionally with uncoupled silica filler, or a mercaptosilane coupled silica present in an amount less than 18 parts per 100 parts of tread rubber.

DETAILED DESCRIPTION OF PREFERRED EMBODIMENTS

Figure 1:
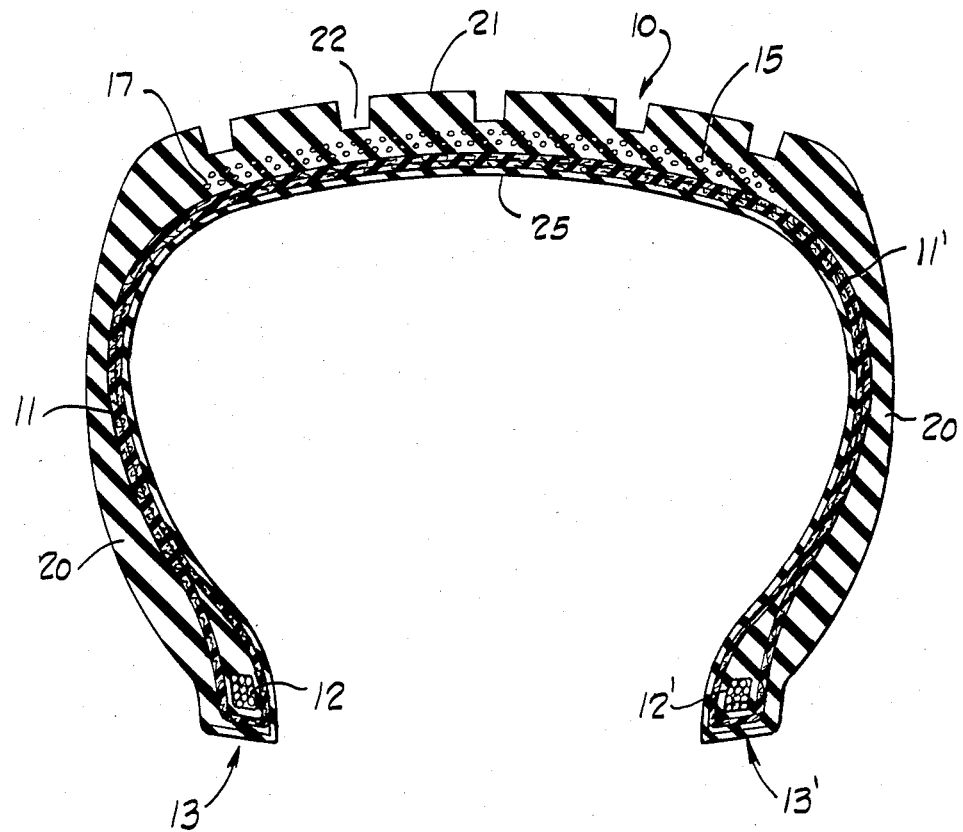
FIG. 1 of the drawing is a cross-sectional view schematically illustrating a typical pneumatic tubeless, radial passenger tire which is the preferred embodiment of this invention utilizing a silica-rich tread.

The invention is particularly directed to pneumatic automobile and truck tires irrespective of their specific constructional details, but is illustrated in a preferred embodiment with reference to a radial cord, tubeless, passenger car tire which comprises a tire carcass bounded by cords embedded in rubber, and terminating in beads which engage the rim of the wheel on which the tire is mounted to contain air under pressure. The cords are protected from abrasion by tread and sidewall rubber, and are made with an integral essentially gas-impervious liner which lines the inner surface of the carcass.

Referring particularly to the drawing in which is schematically illustrated a cross-sectional elevational view of a tire of this invention, indicated generally by reference numeral 10, there are shown two plies of carcass cords 11 and 11' which may be formed from single or plural filaments of rayon, polyester, polyamide, plated steel or other suitable material of high tensile strength such as are conventionally used in the construction of radial tires. The individual cords lie parallel to each other and are thus embedded in rubber of the kind typically used for making belts. The edges of the plies are suitably wrapped around essentially inextensible bead grommets 12 and 12' forming part of the molded beads 13 and 13' shaped for engagement with a standard rim.

The radial cord plies 11 and 11' in the crown of the tire, which is the region of the tire which engages the road surface when the tire is in use, are surrounded by a circumferential belt which is illustrated herein as consisting of two strips of steel cords. The steel cord belt plies 15 and 17 are preferably prepared with the cords in each ply parallel to each other and at an angle to the circumferential central plane of the tire, the cords in one ply extending in a direction opposite to the cords in the other ply. This angle in the finished tire may be from about 15° to about 30° relative to the circumferential central plane. The two crown plies form an essentially inextensible belt around the radial cord plies.

On the interior surface of the tire's carcass is a liner 25 formed from a rubber material which has a high resistance to diffusion of air, such as butyl rubber, or a halogenated butyl rubber, and/or blends thereof, and the liner extends from one bead 13 to the other bead 13' so as to seal against the rim and minimize the loss of gas, typically air, which inflates the tire.

A protective layer of rubber completely surrounds the tire. This is preferably formed from a relatively thin layer of sidewall rubber 20 in the zones where intense flexing occurs, and a relatively thicker layer of rubber tread 21 for resisting road wear and providing desirably low rolling resistance. The tread 21 contacts the road and is typically provided with a suitable nonskid tread pattern 22 of slits, slots, grooves and the like.

The tire 10 of this invention is conventional except for the novel tread which provides unexpectedly low rolling resistance without substantial loss of traction, because of the silica present, and the manner in which the silica is incorporated in the vulcanized tread.

The tread compound contains 100 parts by weight of rubber hydrocarbon, a processing oil in an amount sufficient to form the tread, and a reinforcing filler in an amount from about 50 to about 85 parts.

The tread is preferably based on a synthetic rubber polymer such as polybutadiene which may be blended with smoked sheet plantation rubber, or any of various sulfur-vulcanizable synthetic rubbers other than polybutadiene, preferably cis-polyisoprene which is essentially identical with natural rubber; or, the rubber tread may be any other sulfur-vulcanizable synthetic elastomer such as elastomeric butadiene-styrene copolymers, or one of the EPDM rubbers which are polymers of ethylene and propylene together with a small proportion of a di-unsaturated monomer which makes the polymer sulfur-vulcanizable.

Synthetic rubbers of the type specified above can be made from various raw materials which produce polymers of different kinds. Thus, dienes such as butadiene, isoprene, piperylene, chlorobutadiene, and the like, may be polymerized alone or in admixture with each other or with minor proportions of vinyl or vinylidene compounds such as styrene, vinyl acetate, methyl methacrylate, vinyl pyridine, acrylic acid, acrylonitrile, and the like, either while emulsified in water so as to produce a polymer latex, or while dissolved in a volatile solvent so as to produce a solution. Isobutene may be polymerized with a small proportion of butadiene or isoprene to produce butyl rubber. Ethylene and propylene together with a diene may be polymerized to produce so-called EPDM rubber. Ethylene oxide alone or mixed with propylene oxide or epichlorohydrin, or tetrahydrofuran alone, may be polymerized to produce polyether rubbers. These are only a few of the known varieties of synthetic rubber, but are those presently considered to be most likely to be useful in the practice of this invention. The polymerization catalysts, dispersion media (water or solvent), reaction conditions, and finishing procedures to prepare them in the type specified above are well known but differ somewhat depending on the nature of the chosen monomer and the nature of the dispersion medium, whether water to produce a latex, or a solvent to produce a solution.

Raw rubbers now available to manufacturers of rubber products such as tires, include natural rubber (essentially cis-1,4-polyisoprene) from trees, and synthetic polymers and copolymers made either in latex form or in solution, from various monomers and mixtures of monomers. The synthetic polymers which are considered to be especially suitable for making tires are latex copolymers of butadiene and styrene (SBR); solution polymers of butadiene or of isoprene; solution copolymers of butadiene and styrene; solution copolymers of isobutene with isoprene (butyl rubber); and solution terpolymers of ethylene, propylene, and a diene (EPDM rubber). These are supplied both as essentially uncompounded polymers (with no additives other than antioxidants and small quantities of residues of materials employed for polymerization), and as masterbatches with various grades of carbon black and with paraffinic, naphthenic, or aromatic oils. The following kinds of masterbatches which have been supplied commercially for a number of years are particularly useful for tire treads. The amount of oil or reinforcing filler in a particular masterbatch is given as "parts" meaning parts by weight added to 100 parts of rubber polymer:

| Masterbatch | Parts |
|---|---|
| SBR (from latex) with oils and carbon black | 30 to 85 |
| Poly-butadiene (from solution) with oils and carbon black | 10 to 70 |

A masterbatch having carbon black, like the ones listed hereinabove, will generally be used since it is preferably desired to provide mixed silica and carbon black reinforcing fillers, the former always being present in an amount at least 5 parts by weight based on 100 parts of rubber, and preferably from about 18 to about 50 parts by weight. Quite unexpectedly the composition of the masterbatch does not seem to affect the action of the mercaptosilane coupling agent, nor does it seem to adversely affect the action of the isocyanate blocking agent.

It is most preferred to have a masterbatch in which the rubber polymer consists essentially of a major proportion by weight of SBR and a minor proportion of polybutadiene or other rubber polymer, and there is present from about 15 to about 45 parts of oil in the mixed rubbers, irrespective of the amount of the reinforcing filler used, or the proportions in which mixed silica and carbon black fillers may be used.

It is preferred to use at least 1 part by weight of hydrated amorphous fine-particle silica per 3 parts by weight of carbon black, and no more than 3 parts by weight of the silica per part of carbon black, and it is preferred that at all times there are present at least 18 parts of the silica per 100 parts of natural or synthetic rubber polymer. It is most preferred to have from about 1 part by weight of the silica to less than 2.5 parts by weight of carbon black, though it will be found that processing the tread compound gets progressively more difficult after it contains a major proportion by weight of silica and a minor proportion by weight of carbon black as components of the reinforcing filler, that is, more than 1 part of silica per part of carbon black. For ease of processing, it is preferred to use a minor amount by weight of the silica filler and a major amount of carbon black, the combined fillers being present in an amount in the range from about 60 to about 75 parts per 100 parts of rubber polymer.

The vulcanized tread should contain a sufficient amount of both silica and carbon reinforcing fillers to contribute a reasonably high modulus and high resistance to tear. This combined weight of the fillers may be as low as about 35 parts per 100 parts rubber, but is preferably from about 50 to about 85 parts. The silica filler is an amorphous partially hydrated precipitated silica, commonly used as a filler in an amount less than 20 parts by weight per 100 parts tread rubber but without a coupling agent, in reinforced rubber compositions for tread compounds. The silica filler is commercially available from PPG Industries under the Hi-Sil trademark with designations EP, 233, 210 etc. Though the silica, by itself is a satisfactory filler if used in tread rubber in relatively small amounts, the rolling resistance of a passenger car's tire is reduced if the amount of silica is in the range from about 18 to about 50 parts and 35 parts of carbon black (N-299, say) is added, when the desired combined level of fillers is 53 parts per 100 parts of rubber. The amount of silica used may be as high as about 63 parts combined with 21 parts of the carbon black, when the desired combined level of fillers is 84 parts per 100 parts of rubber.

Most preferred is Hi-Sil®210 which has ultrafine spherical particles having an average primary particle (ultimate) diameter of about 0.22 microns, and a nominal specific area, as measured by nitrogen absorption, of about 150 $m^2/g$. Where minor amounts of carbon black are included, such as SRF, HAF and SAF blacks, the compatibility of Hi-Sil 210 with these blacks requires only minor changes in recipe formulations, such as adding secondary accelerators to compensate for slight differences in cure rates.

The vulcanizing ingredients may be any materials capable of crosslinking the particular synthetic rubber used. In the case of diene rubbers, sulfur, together with a little zinc oxide, stearic acid or a similar fatty acid, and a vulcanization accelerator, are generally most convenient. With chemically saturated rubbers such as polyethers, a peroxide such as dicumyl peroxide is generally used. In any case, any suitable vulcanizing agents may be used, including even irradiation in some situations. The amount of vulcanizing ingredients effective to produce the desired vulcanization of the tire is so small in comparison with the amount of rubber that reference to 'vulcanized rubber' herein ignores their presence for the purpose of defining the invention.

In addition, an effective amount of an antioxidant should be used, sufficient to protect the tread rubber from premature deterioration due to exposure to the elements during use. The usual materials used for this purpose are phenyl-beta-naphthylamine, diphenyl-p-phenylenediamine, polymerized trimethyl-dihydroquinoline, hydroquinone-monobenzyl ether, polybutylbisphenol A, and the like, in quantities from about 1 to about 5 parts.

Finally, it is also desirable to include an antiozonant such as N-phenyl-N'-isopropyl-p-phenylenediamine; lubricants, processing aids and the like, all of which are conventionally chosen depending upon the requirements of the particular recipe as learned from experience in the art of compounding.

The coupling agent which provides the surprisingly desirable properties of a silica-rich tire tread is a mercaptosilane having the structure R'Si(OR) wherein R' represents a mercapto organo-functional group and OR represents a hydrolyzable alkoxy group attached to silicon. R' is typically bonded to the silicon atom by a short alkyl chain having from one to about 6 carbon atoms. In use, the functional mercapto group reacts with the polymer matrix. The alkoxy groups are thought to hydrolyze in the presence of moisture typically found on the surface of the hydrated silica particles, and form silanols which react with or otherwise condense in the presence of the silica.

The effectiveness of the mercaptosilane is predicated on its reactivity with both the rubber polymer and the silica filler. Where carbon black is also present, it will be expectedly unreactive with the mercaptosilane, but would also expectedly adsorb a significant amount of the silane and thus substantially decrease its effectiveness. Quite unexpectedly, this does not appear to occur under the conditions of vulcanization, as no more than about 3 parts of silane, generally less than 2 parts, and more preferably from about 0.5 to about 2.0 parts, are effective to produce the benefits of the silica reinforcing. As vulcanization typically occurs at a temperature in the range from about 300° F. to about 500° F., it is specially noteworthy that neither the isocyanate presence nor the adsorption of the silane on the carbon, adversely affects the time for vulcanization or its effectiveness.

EXAMPLES 1-3

To illustrate the invention, a typical automobile tire tread composition of highest quality was selected, containing 40 parts by weight of a cis-1,4-butadiene (CB) polymer, and 60 parts of a copolymer of about one-fourth styrene and three-fourths butadiene (SBR). To this was added 37 parts of Paraflux petroleum oil, and the usual small quantities of vulcanizing agents, namely sulfur, zinc oxide, stearic acid and a vulcanization accelerator, along with protective antioxidants and antiozonants. The composition was given a preliminary mechanical mixing in a Banbury mixer, finished by mixing on a two-roll mixing mill, then shaped into a tread applied to a belted tire carcass, and the tire vulcanized at about 400° F. by heating under a pressure in the range from about 100 psig to about 500 psig in a mold for a period of time sufficient to produce the desired degree of vulcanization.

In Example 1, conventional N-299 carbon black was used as the only reinforcing filler so it was unnecessary to add any coupling agent. In examples 2 and 3, progressively higher amounts of Hi-Sil 21 silica are used, necessitating the addition of a 3-mercaptopropyl trimethoxysilane coupling agent (such as A-189, available commercially from Union Carbide Corp) which has been reversibly blocked by reaction with an isocyanate, preferably an aromatic isocyanate such as toluene diisocyanate present in at least an equimolar amount so as to transform the liquid mercaptosilane into a solid. The mercaptosilane remains in the vulcanized tread rubber.

Similar results are obtained with other mercaptoalkyl silane esters by forming temporary addition compounds with toluene diisocyanate, or with any other organic compound known to be capable of forming addition compounds in which the active functional groups are temporarily blocked but are readily unblocked for addition reactions at a sufficiently high vulcanization temperature.

In the following Table I is listed the recipes for the conventional carbon black reinforced tread, and two treads of this invention. Also listed are particular physical properties for each of the treads in Table II, and Tire Performance Properties in Table III.

TABLE I

| Ingredient | Ex. 1 | Ex. 2 | Ex. 3 |
|---|---|---|---|
| Polybutadiene | 40. | 40. | 40. |
| SBR | 60. | 60. | 60. |
| Zinc oxide | | | |
| Agerite Resin D antioxidant | | | |
| Stearic acid | | | |
| Santoflex 13 antiozonant | | | |
| Paraflux oil | 7. | 7. | 7. |
| Sulfur | .75 | .75 | .75 |
| OBTS accelerator | .75 | 1.10 | 1.20 |
| CureRite 18 accelerator | 1.0 | .75 | .75 |
| PVI retarder | .10 | .10 | .10 |
| Coupling agent* | .0 | .03 | .06 |
| N-299 tread carbon black | 2. | 4. | 5. |
| Hi-Sil 210 Hydrated silica | .0 | 3. | 5. |

*The coupling agent is A-189 silane (52.7%) reacted with TDI (46.7%).

TABLE II

PHYSICAL PROPERTIES

| | Ex. 1 | Ex. 2 | Ex. 3 |
|---|---|---|---|
| Stress/Strain, 15' @ 320° F.: | | | |
| Tensile | 175 | 225 | 200 |
| 300% Modulus | 100 | 150 | 200 |
| % Elongation | 00 | 100 | 00 |
| BFG Flexometer, 45' @ 300° F., 17½/15/118 | | | |
| Initial Compression | 0.3% | 2.3% | 2.2% |
| Flexural Compression | .179 | 1.167 | .174 |
| Permanent Set | .2% | .3% | .2% |
| Heat Build-up | 3° F. | 0° F. | 2° F. |
| Durometer | 0 | 5 | 5 |
| Roelig Hysteresis, 45' @ 300° F. | | | |
| Tan δ | .2203 | 1.1673 | 1.1408 |
| PS (Stress Cycling Power Loss) | 1.1319 | 1.1193 | 1.1072 |

TABLE III

TIRE PERFORMANCE PROPERTIES*

| | Ex. 1 | Ex. 2 | Ex. 3 |
|---|---|---|---|
| Rolling Resistance** | | | |
| 67" rolling resistance Index | 00 | 3 | |
| Twin Roll rolling resistance Index | 00 | 14 | 0 |
| Traction** | | | |
| WET: Avg. 20 mph + 60 mph Index | 00 | 6 | 7 |
| DRY: 40 mph Index | 00 | 03 | 05 |

*Tire Size/Design P215/75R15 P595
**GM Procedure

The foregoing data is illustrative of the reduction in rolling resistance obtained, often with an improvement in dry traction, and only a slight loss of wet traction. These characteristics are observed even when certain low rolling resistance tread compounds are silica-enriched according to our invention. By "low rolling resistance tread compound" I refer to one which is especially formulated to reduce the rolling resistance of the tire, as for example compounds disclosed in U.S. Pat. Nos. 4,281,703 and 4,224,197; or, a recently commercially available straight styrene-butadiene rubber with a high vinyl content as well as a unique microstructure, sold under the trademark Cariflex SSCP 901.

We claim:

1. In a tubeless pneumatic tire comprising two spaced apart essentially inextensible beads, a ground contacting tread portion comprising a vulcanized rubber including at least two reinforcing fillers and an antioxidant, a pair of sidewalls extending radially inward from the axial outer edges of said tread portion to join the respective said beads, a carcass portion having at least one ply of rubberized cords wrapped around said beads, and a circumferential belt comprising at least two plies of essentially inextensible cords with the cords in each ply parallel to each other, the improvement consisting essentially of the tread being formed of (i) a fine particle amorphous hydrated silica present in an amount in the range from 18 parts to about 50 parts by weight, based on the total weight of 100 parts of natural or synthetic rubber used in said tread, in combination with from about 0.333 parts to about 2 parts carbon black for each part of said silica, the combined total of said silica and carbon black fillers being in the range from about 50 parts to about 85 parts per 100 parts of said rubber, and, (ii) a mercapto-substituted silane coupling agent for bonding said silica to said rubber of said tread, said mercapto-substituted silane having the reactivity of the mercapto group reversibly blocked by the presence of at least an equivalent quantity of an organic compound capable of a simple addition reaction to the mercapto compound, so that the rolling resistance is less than that of an otherwise identical tire having less than 18 parts by weight of said silica present, based on 100 parts of said rubber, and the dry traction of said tire is substantially the same as that of said otherwise identical tire.

2. The tire of claim 1 wherein said mercaptosilane has the structure

wherein,

R' represents a mercapto organo-functional group, and

OR represents a hydrolyzable alkoxy group attached to Si.

3. The tire of claim 1 wherein said organic compound is an aromatic diisocyanate.

4. The tire of claim 3 wherein said aromatic diisocyanate is toluene diisocyanate.

5. In a tubeless pneumatic radial tire comprising two spaced apart essentially inextensible beads, a ground contacting tread portion comprising a vulcanized rubber including at least two reinforcing fillers and an antioxidant, a pair of sidewalls extending radially inward from the axial outer edges of said tread portion to join the respective said beads, a carcass portion having at least one ply of rubberized cords lying essentially in radial planes wherein said cords are wrapped around said beads, an integral air impervious inner liner disposed inwardly of said carcass portion, and a circumferential belt comprising at least two plies of essentially inextensible cords with the cords in each ply parallel to each other and at an angle to the circumferential central plane of the tire and with the cords in one ply extending in a direction opposite to the cords in the other ply, the improvement consisting essentially of the tread being formed of (i) a fine particle amorphous hydrated silica present in an amount in the range from 18 parts to about 50 parts by weight, based on the total weight of 100 parts of natural or synthetic rubber in said tread, in combination with from about 0.333 parts to about 2 parts carbon black for each part of said silica, the combined total of said silica and carbon black fillers being in the range from about 50 parts to about 85 parts per 100 parts of said rubber, and, (ii) a mercapto-substituted silane coupling agent for bonding said silica to said rubber of said tread, said mercapto-substituted silane having the reactivity of the mercapto group reversibly blocked by the presence of at least an equivalent quantity of an organic compound capable of a simple addition reaction to the mercapto compound, so that the rolling resistance is less than that of an otherwise identical tire having less than 18 parts by weight of said silica present, based on 100 parts of said rubber, and the dry traction of said tire is substantially the same as that of said otherwise identical tire.

6. The tire of claim 5 wherein said mercaptosilane has the structure

wherein,

R' represents a mercapto organo-functional group, and

OR represents a hydrolyzable alkoxy group attached to Si.

7. The tire of claim 5 wherein said organic compound is an aromatic diisocyanate.

8. The tire of claim 7 wherein said aromatic diisocyanate is toluene diisocyanate.

* * * * *